United States Patent [19]
van Deventer

[11] Patent Number: 5,473,463
[45] Date of Patent: Dec. 5, 1995

[54] OPTICAL HYBRID

[75] Inventor: Mattijs O. van Deventer, Leidschendam, Netherlands

[73] Assignee: Koninklijke PTT Nederland N.V., AC Groningen, Netherlands

[21] Appl. No.: 61,307

[22] Filed: May 13, 1993

[51] Int. Cl.⁶ .................................................. H04B 10/06
[52] U.S. Cl. ........................................ 359/192; 359/189
[58] Field of Search ................................. 359/189, 190, 359/191, 192

[56] References Cited

U.S. PATENT DOCUMENTS

| | | | |
|---|---|---|---|
| 4,979,235 | 12/1990 | Rumbaugh et al. | 359/192 |
| 5,060,312 | 10/1991 | Delavaux | 359/192 |
| 5,115,332 | 5/1992 | Naito et al. | 359/192 |
| 5,124,828 | 6/1992 | Mahon | 359/192 |
| 5,170,275 | 12/1992 | Large | 359/192 |

FOREIGN PATENT DOCUMENTS

| | | | |
|---|---|---|---|
| 0271934 | 6/1988 | European Pat. Off. | 359/192 |
| 0230129 | 10/1991 | Japan | 359/192 |
| 2214381 | 8/1989 | United Kingdom . | |
| 8607513 | 12/1986 | WIPO | 359/192 |

OTHER PUBLICATIONS

Joachim Pietzsch, "Scattering Matrix Analysis of 3×3 Fiber Couplers," *Journal of Lightwave Technology*, Feb. 1989, pp. 303–307, vol. 7, No. 2.

R. Langenhorst et al, "Balanced 3×3 Port Phase Diversity Receiver with Reduced Input of Thermal Noise", *Electronic Letters*, vol. 26, No. 9, Apr. 1990.

G. Schmitt et al, "Integrated Optical 3×3–Coupler on LiNbO₃; comparison between theory and experiment", 5th *European Conference Integrated Optics:, ECIO*, 1989, pp. 67–71.

"Summaries of Papers presented at the Optical Fiber Communication Conference," Feb. 6–9, 1989, Optical Society of America And Lasers And Electro–Optics Society of IEEE.

M. O. Van Deventer, "Phase–Diversity Hybrid Optimization in Case of a Two–Detector Receiver", Sep. 1992, pp. 1060–1062, IEEE Photonics Technology Letters, vol. 4, No. 9.

Sang K. Sheem, "Optical fiber interferometers with [3×3] directional couplers: Analysis", Jun. 1981, pp. 3865–3872, J. Appl. Phys. 52(6).

Y. Wang et al, "A 90° optical fiber hybrid for optimal signal power utilization", Oct. 1, 1987, pp. 4181–4184, Applied Optics, vol. 26, No. 19.

L. G. Kazovsky, "Phase– and Polarization–Diversity Coherent Optical Techniques", Feb. 1989, pp. 279–292, Journal of Lightwave Technology, vol. 7, No. 2.

*Primary Examiner*—Leo H. Boudreau
*Assistant Examiner*—Bhavesh Mehta
*Attorney, Agent, or Firm*—Frishauf, Holtz, Goodman, Langer & Chick

[57] ABSTRACT

In known coherent optical receivers with two detectors, optical 90° hydrids have a throughput ≦25%. Theoretical analysis shows that a higher throughput, up to a maximum of approximately 29.3%, is possible. The invention provides such a 90° hybrid (30) of the polarisation type. In an optical hybrid (3) having a structure known per se, i.e. polarisation controllers (38, 39) at the inputs (40 and 41) of a power coupler (42), and polarisers (45, 46) at the outputs (43 and 44) thereof, the polarisation controllers and the polarisers are put into such positions, that the points on the Poincaré sphere, which correspond to those positions, comply with two conditions which guarantee a 90° phase difference and the higher throughput. For example, the positions correspond to points which represent positions in which the polarisation controllers produce mutually opposite elliptical polarisations at an angle $\alpha$ and the polarisers are placed linearly at angles $\alpha$ and $-\alpha$, and $\alpha=32.8°$.

6 Claims, 2 Drawing Sheets

OPTICAL HYBRID

BACKGROUND OF THE INVENTION

1. Field of the Invention

The invention is in the field of coherent optical detection techniques. It relates to an optical hybrid and a coherent optical receiver, in which the optical hybrid is used.

2. Prior Art

Coherent optical detection making use of phase diversity enables baseband detection without having to use "phase-locked-loop" (PLL) as it is certainly the case with homodyne detection. As it is thus possible to make efficient use of the electrical and optical bandwidth, phase diversity is therefore very suitable for multichannel coherent optical communication with high bit rates ($\geq 1$ Gbit/s). In addition, considerations regarding noise suppression, such as thermal noise, make it attractive to use phase diversity at high bit rates.

In order to recover the amplitude and the phase of a coherent optical signal, use is made, in the case of phase diversity of optical hybrids. An optical hybrid is an m×n multi-port having m signal inputs and n signal outputs, in which $m,n \geq 2$, which optical hybrid, at two or more of the outputs, emits coherent products of signals presented at two or more of the inputs, which products have mutually well-defined phase differences. There are two types of such optical hybrids used for phase-diversity. Hybrids of the first type, called the polarisation type, generally achieve the desired phase differences between output signals having different polarisations, this being in contrast to those of the second type, called the coupling type, in which the phase differences between output signals having the same polarisation are achieved. Several versions are known of the polarisation type.

A first version of the polarisation type is a 2×2 port based on the combination of a power coupler and a polarisation splitter. In this case, a phase shift of 90° is induced at the input of the polarisation splitter, between the split components, emerging from the splitter, of a mixed signal which comes from the coupler and which consists of a received signal and the signal coming from a local oscillator. Such a first version of a 2×2 port is disclosed, for example, by reference [1]. A second version, disclosed by reference [2], is a 2×2 port based on a power coupler;splitter having polarisation controls in the inputs and linear polarisers, set mutually orthogonally, in the outputs. In a third version, as disclosed by reference [3], setting of the 90° phase difference takes place by first separately polarising the input signals elliptically. The elliptically polarised signals are then combined and split in a power-splitting coupler, and are finally split out, with the aid of two polarisation-splitting couplers, into four signals having relative phases of 0°, 90°, 180° and 270°.

The sensitivity of all these known versions of polarisation-type multiports is the same if all the signals on the output side of such a multiport are used for detection and thermal noise is supressed as much as possible in the process. The use of more than two detectors in this case, however, makes a receiver complex and, moreover, expensive. If, moreover, balanced detection is used, this results in a decreasing bandwidth of the receiver and an increase in thermal noise. It is therefore desirable not to have to use more than two detectors for the detection. For a two-detector receiver, however, the known polarisation-type optical hybrids are not optimal. In the known polarisation-type m×n ports having a 90° phase difference, the throughput is always $\leq 25\%$, that is to say that never more than 25% of the signal power at the input is extracted into each of the outputs used. Since optical hybrids which can be used for phase diversity can also be used for 'image-rejection' heterodyne receivers, as disclosed, for example, by reference [4], the same restriction applies to receivers of this type with respect to the throughput.

SUMMARY OF THE INVENTION

The object of the invention is to provide an optical hybrid of the polarisation type having a higher throughput, which is therefore more advantageous for use in a two-detector receiver for coherent optical detection. Theoretical analysis of a passive, not necessarily loss-free 2×2 port shows that, in the case of a phase difference of 90°, a throughput R of at most approximately 29% is still possible. The invention achieves this in a polarisation-type optical hybrid.

Conventionally, a Poincaré representation is used to describe polarisation states of an optical signal and changes therein are described with the aid of points on a sphere called a Poincaré sphere. Polarisation-dependent components in an optical device which impose a defined polarisation state onto an optical signal, can also be represented by points on this sphere. Making use of this, it has been found that, of an optical hybrid having a structure disclosed per se by reference [2], the polarisation-dependent components can be put into such positions, (i.e. settings of the polarisation controllers and placements of the polarisation analysers), the points on the Poincaré sphere corresponding to these positions fulfilling specific conditions, that in each case a 90° hybrid is obtained having a throughput greater than 25%. An optical hybrid comprising a first and a second input port for launching a first and a second input signal, respectively, a first and a second output port for extracting a first and a second output signal, respectively, a polarisation controller on each of the input ports for setting the polarisation of each of the input signals, a polarisation-independent power coupler for mixing and distributing evenly, according to power, the signals which are set according to polarisation, and a polariser on each of the output ports, the output signals including, respectively, a first and a second coherent product of each of the input signals with a mutual phase difference of approximately 90°, to this end according to the invention is characterised in that the polarisation controllers are set to positions which, on the Poincaré sphere, correspond to points S1 and S2, and the polarisers are placed in positions which, on the Poincaré sphere, correspond to points S3 and S4, the angles on the sphere between S1 and S3, between S1 and S4, between S2 and S3, and between S2 and S4 all being smaller than 90°, and the cirle through the points S1, S2 and -S3, and the circle through the points S1, S2 and -S4 intersecting each other at angles of 90°, the points -S3 and -S4, respectively, being the antipodes of the points S3 and S4.

A further object of the invention is to provide a coherent optical receiver in which an optical hybrid according to the invention is used.

REFERENCES

[1] T. G. Hodgkinson, et al.: "Demodulation of optical DPSK using in-phase and quadrature detection", Electronics Letters, 12th September 1985, Vol. 21, No. 19, pp. 867,868;

[2] L. G. Kazovsky, et al.: "All-fiber 90° optical hybrid for coherent communications", Applied Optics, Vol. 26, No. 3, 1 February 1987, pp. 437–439;

[3] GB-A-2214381 entitled "Optical phase-diversity receivers";
[4] C. J. Mahon: "Experimental verification of novel optical heterodyne image rejection receiver with polarization control", ECOC '90 Amsterdam, Vol. 1, pp. 389–392;
[5] J. Pietzsch: "Scattering matrix analysis of 3×3 fiber couplers", Journ. Lightwave Technology, Vol. 7, NO. 2, February 1989, pp. 303–307.

BRIEF DESCRIPTION OF THE DRAWING

The invention will be described below in more detail with reference to a drawing consisting of the following figures:

FIG. 4b shows points on the Poincaré sphere which correspond to the positions according to FIG. 4a;

FIG. 5b shows points on the Poincaré sphere which correspond to the positions according to FIG. 5a.

E. DESCRIPTION OF ILLUSTRATIVE EMBODIMENTS

Figure 1:
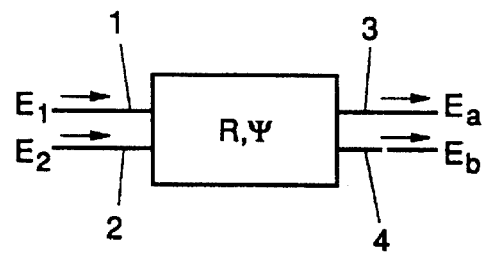
FIG. 1 shows a block diagram of a general 2×2 port which can be used as an optical hybrid.

FIG. 1 depicts a block diagram of a general 2×2 port, which is known as an optical hybrid. A port of this type has two inputs 1 and 2 and two outputs 3 and 4, and a throughput R and a phase angle $\Psi$. If input signals $E_1$ and $E_2$ having amplitudes $\acute{E}_1$ and $\acute{E}_2$, respectively, and having an arbitrary mutual phase difference $\Phi$ are presented at inputs 1 and 2 of said port, respectively viz.:

$$E_1(t) = \acute{E}_1 \cos(\omega t) \quad (1a)$$

$$E_2(t) = \acute{E}_2 \cos(\omega t + \Phi) \quad (1b)$$

the signals at the outputs 3 and 4 can then be written as $$E_a(t) = R^{1/2}\{\acute{E}_1 \cos(\omega t) + \acute{E}_2 \cos(\omega t + \Phi)\} \quad (2a)$$

$$E_b(t) = R^{1/2}\{\acute{E}_1 \cos(\omega t) + \acute{E}_2 \cos(\omega t + \Phi + \omega)\} \quad (2b)$$

If such a port is passive, the total output power is always less than or equal to the input power for each value of the amplitudes $\acute{E}_1$, $\acute{E}_2$ and phase difference $\Phi$. If $\acute{E}_a$ and $\acute{E}_b$ represent the amplitudes of the output signals $E_a(t)$ and $E_b(t)$, respectively, the following relationship therefore holds true:

$$\acute{E}_a^2 + \acute{E}_b^2 \leq \acute{E}_1^2 + \acute{E}_2^2 \quad (3)$$

By combining the expressions (2a), (2b) and (3) it can be deduced that $$R \leq \{4 \cos^2(\omega/4)\}^{-1} \quad (4)$$

Figure 2:
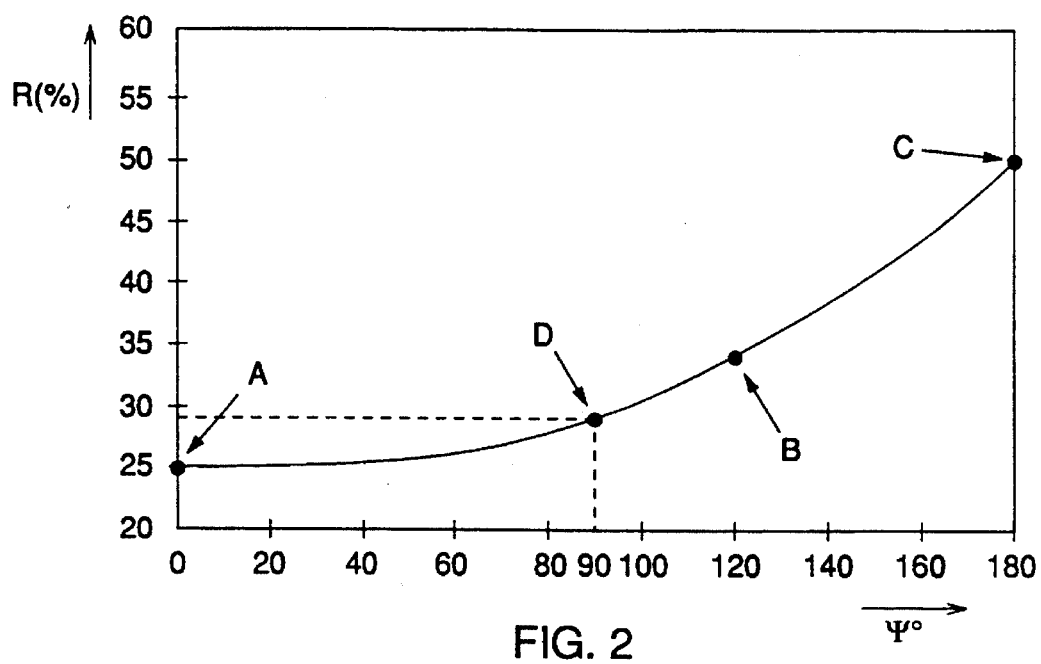
FIG. 2 shows the course of the upper limit of the throughput R as a function of the phase angle $\Psi$ of an optical hybrid according to FIG. 1.

The expression (4) defines an upper limit for the throughput R as a function of the phase angle $\omega$ of the hybrid. The course of this upper limit is depicted in FIG. 2. In this figure:

point A ($\omega=0°$, R=25%) corresponds to a phase-shifting-type optical hybrid having four Y junctions;

point B ($\omega=120°$, R=33.3%) corresponds to a symmetrical 3×3 coupler;

point C ($\omega=180°$, R=50%) corresponds to a symmetrical 2×2 coupler.

Point D ($\omega=90°$, R=29.3%) represents, at least theoretically, an optical hybrid having a phase shift of 90°, hereinafter called 90° hybrid, and a throughput of more than 25%.

Hereinafter, an embodiment of such a 90° hybrid of the polarisation type will be described, such as can be used in a coherent detection system employing phase diversity with two photodetectors.

Figure 3:
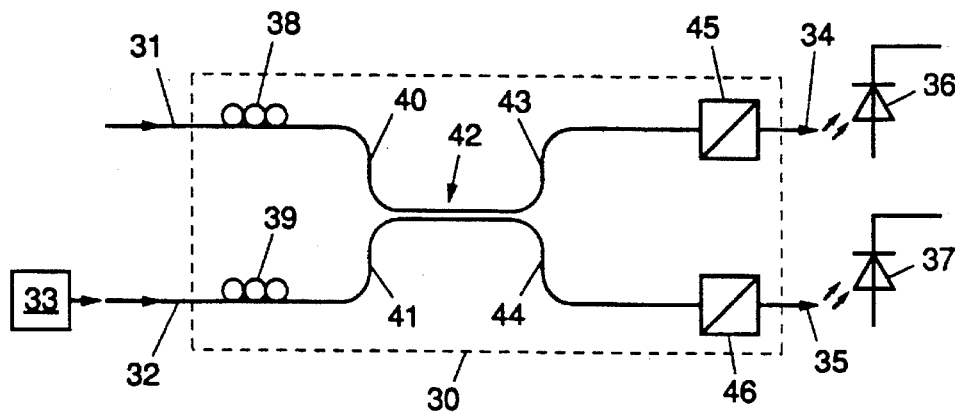
FIG. 3 shows a diagram of a coherent optical phase-diversity receiver with a polarisation-type optical hybrid.
Figure 4A:
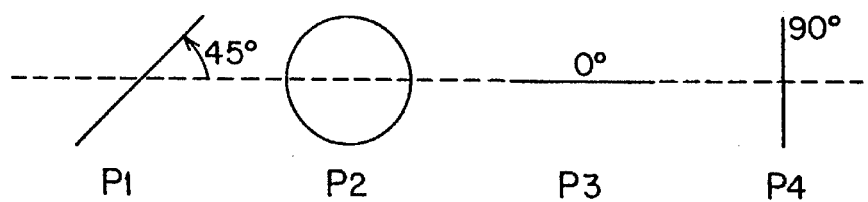
FIG. 4a shows known positions of the polarisation-dependent components for a 90° hybrid in the receiver according to FIG. 3.
Figure 4B:
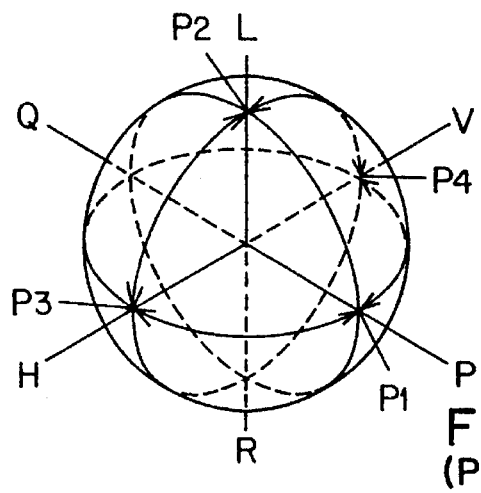

FIG. 3 depicts a diagram of a coherent optical phase-diversity receiver having a 90° hybrid 30 with a structure known per se (see reference [2] under C., more particularly FIG. 1). Said hybrid 30 has a first signal input 31 for a received signal and a second signal input 32 for an oscillator signal coming from a local oscillator 33. The hybrid 30 furthermore has a first signal output 34 and a second signal output 35, coupled with a first photodetector 36 and a second photodetector 37, respectively. The first signal input 31 and the second signal input 32 are passed via a first polarisation controller 38 and a second polarisation controller 39, respectively, to inputs 40 and 41 of a 3 dB power coupler 42. Outputs 43 and 44 of the power coupler 42 are passed via a first linear polariser 45 and a second linear polariser 46, respectively, to the signal outputs 34 and 35. In the known hybrid, the linear polarisers 45 and 46 are placed, as is conventional, at angles of 0° and 90° with respect to the horizontal, respectively, while the polarisation controllers 38 and 39 are set to a linear polarisation at an angle of 45° and to a circular polarisation, respectively. Said placements and settings, hereinafter jointly referred to as positions, are depicted diagrammatrically in FIG. 4a. In this figure, the positions of the polarisation controllers 38 and 39 and of the polarisers 45 and 46 are indicated by P1, P2, P3 and P4, respectively. In a Poincaré representation, said positions correspond to points on a sphere called the Poincaré sphere. This is depicted in FIG. 4b, the points in question being indicated by P1 to P4 inclusive. The points P3 and P4 are situated at diametrically opposed points on the Poincaré sphere, i.e. they are each other's antipodes on the sphere, which is expressed by P3=P4. The points P1, P2 and -P3 on the Poincaré sphere define a circle B1 on the Poincaré sphere, and the points P1, P2 and -P4 define a circle B2 on the Poincaré sphere. The circles B1 and B2 intersect each other at points P1 and P2 at angles of 90°, i.e. tangent lines of the circles at each intersecting point (in FIG. 4b a tangent line t1 of the circle B1 at point P2 and a tangent line t2 of the circle B2 at point P2 are shown) are orthogonal. It has been found, that since the circles B1 and B2 intersect at angles of 90°, the points P1, P2, P3 and P4 represent a 90° hybrid. Moreover it has been found, that since the angles of arc on the sphere between P1 and P3, P1 and P4, P2 and P3, and P2 and P4 are all 90°, no throughput higher than 25% is possible for this hybrid.

Figure 5A:
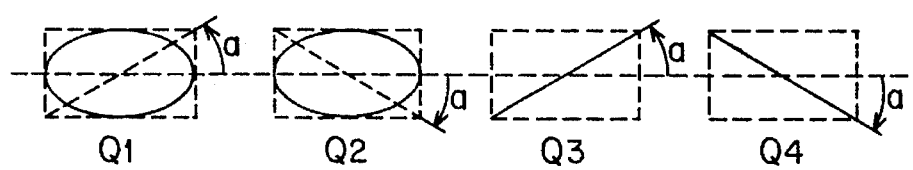
FIG. 5a shows, in a manner similar to that of FIG. 4a, positions of the polarisation-dependent components for a 90° hybrid according to the invention.
Figure 5B:
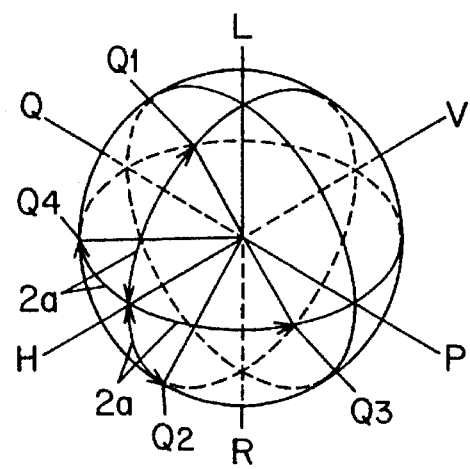

In the most general case, a 90° hybrid having a higher throughput is obtained if the corresponding points on the sphere are situated in such a way that two requirements are satisfied, viz. that said angles of arc are all smaller than 90° and that the circles indicated intersect at angles of 90°. Hereinafter it will be shown that, if the linear polarisers 45 and 46 are placed at angles et and −α with respect to the horizontal, respectively, and the polarisation controllers 38 and 39 are set to producing left-hand and right-hand elliptical polarisation at the same angle α, respectively, said angle et can be chosen in such a way that the corresponding points on the Poincaré sphere satisfy said two requirements and the theoretically highest throughput R can be achieved at the same time. Said positions for the polarisers and the controllers are depicted diagrammatically in FIG. 5a. In this figure, said optimum positions of the polarisation controllers 38 and 39 and the polarisers 45 and 46 are indicated by Q1, Q2, Q3 and Q4 respectively. Said positions Q1 to Q4 inclusive correspond to points indicated accordingly on the Poincaré sphere as depicted in FIG. 5b. Further points -Q3 and -Q4, antipodes of the points Q3 and Q4 on the sphere, respectively, a a circle C1 uniquely defined by the points Q1, Q2 and -Q3, a circle C2 uniquely defined by the points Q1, Q2 and -Q4, and tangent lines t3 and t4 of the circles C1 and C2, respectively, which intersect each other at right angles in one of the intersecting points, e.g. Q1, are depicted in FIG. 5b in a way that is similar to FIG. 4b. In the case of a hybrid with such positions for the polarisation-dependent components, it is possible to derive, for example using the known polarisation-matrix calculation according to Jones, the following expressions for the phase angle ω and the throughput R as a function of the angle α:

$$\omega = 180° - 4*arctan(tan^2\alpha) \quad (5)$$

and $$R = \frac{1}{2}(cos^4\alpha + sin^4\alpha)*100\% \quad (6)$$

For a 90° hybrid it is required that the phase angle α=90°. According to the expression (5), this is achieved at the setting angle α≈32.77°, while according to expression (6), at said α the throughput R≈29.3%, exactly equal to the theoretical upper limit already found hereinbefore (see point D in FIG. 2). It is not just the one set of points Q1 to Q4 inclusive, based on the setting angle α found, which corresponds to an optimal 90° hybrid. In fact, each set of four points on the Poincaré sphere which can be converted by rotation into the set Q1 to Q4 inclusive, represents such an optimum hybrid. Since retardation corresponds to such a rotation, any retardation of the set is therefore also permitted.

The expressions (5) and (6) have in fact been derived for constant input polarisations of the input signals at the signal inputs 31 and 32. In order to achieve optimum use of a 90° hybrid based thereupon, it has to be ensured that this is the case. This can be achieved in a conventional manner by subjecting one or each of the two input signals to a prior active polarisation control, which is driven via a feedback loop from the downstream electrical circuit. Another possibility to achieve this is to place a polariser upstream of one or each of the two signal inputs. The hybrid can then be set to a fixed position and the phase angle no longer depends on residual fluctuations in the input polarisations.

I claim:
1. Optical hybrid comprising:
   a first and a second input port for receiving a first and a second input signal, respectively,
   a first and a second output port for emitting a first and a second output signal, respectively,
   a first and a second polarisation controller on the first and the second input ports, respectively, for setting the polarisation of the first and second input signals, respectively,
   a polarisation-independent power coupler for mixing the first and second input signals, the polarizations of which are set to form a mixed signal, and for distributing evenly according to power the mixed signal over the first and second output ports,
   a first and a second polariser on the first and second output ports, respectively, and
   the output signals including, respectively, a first and a second coherent product of each of the input signals with a mutual phase difference of at least approximately 90°,
   the first and second polarisation controllers are set to first and second positions respectively, and
   the first and second polarisers are placed in third and fourth positions, respectively,
   wherein said first and second positions of the first and second polarisation controllers, respectively, and the third and fourth positions of the first and second polarizers, respectively, are such that points Q1, Q2, Q3 and Q4, which in a Poincaré representation represent said first, second, third and fourth positions, respectively on a Poincaré sphere fulfill the following two requirements:
   (a) angles of arc on the Poincaré sphere which express distances on the Poincaré sphere between the points Q1 and Q3, between the points Q1 and Q4, between the points Q2 and Q3 and between the points Q2 and Q4 all being smaller than 90°, and
   (b) a circle C1 on the Poincaré sphere uniquely defined by the points Q1, Q2 and -Q3, and a circle C2 on the Poincaré sphere uniquely defined by the points Q1, Q2 and -Q4 intersecting each other at angles of 90° at their intersecting points Q1 and Q2, the points -Q3 and -Q4, respectively, being points on the Poincaré sphere that are diametrically opposed to the points Q3 and Q4.

2. Optical hybrid according to claim 1, wherein the points Q1 to Q4 inclusive are points which, by rotation on the Poincaré sphere, can be converted into points representing positions in which the polarisation controllers are set to a mutually essentially equal but oppositely directed elliptical polarisation at an angle α, and the polarisers are linear and are essentially positioned at angles α and -α.

3. Optical hybrid according to claim 2, wherein
the angle α is approximately 32.8°.

4. Coherent optical receiver comprising an optical local oscillator, polarization control means for matching/adjusting with respect to one another two signals, namely a received optical signal and a signal coming from the local oscillator, an optical hybrid having two input ports for receiving the two signals and a plurality of output ports for extracting coherent products of the two received signals, which coherent products differ in phase, and detection means for detecting said coherent products, said optical hybrid emitting a first and a second output signal via a first and a second output port of said plurality of output ports, respectively, said first and second output signals having a phase difference with respect to one another of 90° wherein the detection means comprise only two photodetectors, a first one of said two photodetectors being coupled with the first output port and the second one of said two photodetectors being coupled with the second output port of the optical hybrid, and wherein a power transmission occurs from each of the two input ports of the optical hybrid to each of the first and second output ports to which the first and the second one of said two photodetectors are coupled, which power transmission is greater than 25%, wherein said optical hybrid includes a first and a second polarization controller on the first and second input port of said optical hybrid, respectively, for setting the polarization of the first and the second input signal, respectively, a polarization-independent power coupler for mixing the first and second input signals, the polarizations of which are set to form a mixed signal, and for distributing evenly according to power the mixed signal over the first and the second output ports, and a and a second polarizer on the first and the second output respectively, and wherein the first and second polarization controllers are set to a first and a second position, respectively, and the first and second polarizers are placed in a third and a fourth position, respectively, said first and second positions of the first and second polarization controllers, respectively, and the third and fourth positions of the first and second polarizers , respectively, being such that points Q1, Q2, Q3 and Q4, which in a Poincaré representation represent said first, second, third and fourth positions, respectively, on a Poincaré sphere fulfill the following two requirements:

(a) angles of arc on the Poincaré sphere which express distances on the Poincaré sphere between the points Q1 and Q3, between the points Q1 and Q4, between the points Q2 and Q3 and between the points Q2 and Q4 all being smaller than 90°, and (b) a circle C1 on the Poincaré sphere uniquely defined by the points Q1, Q2 and -Q3, and a circle C2 on the Poincaré sphere uniquely defined by the points Q1, Q2 and -Q4 intersecting each other at angles of 90° in their intersecting points Q1 and Q2, the points -Q3 and -Q4, respectively, being points on the Poincaré sphere that are diametrically opposed to the points Q3 and Q4.

5. Coherent optical receiver according to claim 4, wherein said polarization controllers and said polarizers have positions represented by the points Q1 to Q4 inclusive on the Poincaré sphere, which, by rotation on the Poincaré sphere, are convertible into points representing positions in which the polarization controllers are set to a mutually essentially equal but oppositely directed elliptical polarization at an angle $\alpha$, and the polarizers are linear and are essentially positioned at angles $\alpha$ and $-\alpha$.

6. Coherent optical receiver according to claim 5, wherein said angle $\alpha$ is approximately 32.8°.

* * * * *

UNITED STATES PATENT AND TRADEMARK OFFICE
CERTIFICATE OF CORRECTION

PATENT NO. : 5,473,463
DATED : December 5, 1995
INVENTOR(S) : Mattijs O. VAN DEVENTER It is certified that error appears in the above-indentified patent and that said Letters Patent is hereby corrected as shown below:

Column 1, line 45, replace "coupler;splitter" with --coupler/splitter--.

Column 2, line 21, delete "are described";
line 51, replace "cirle" with --circle--.

Column 3, line 51, replace "($\omega t+\Phi+\omega$)}" with --($\omega t+\Phi+\Psi$)}--;
line 64, replace "$\omega/4$" with --$\Psi/4$--;
line 67, replace "$\omega$" with --$\Psi$--.

Column 4, line 2, replace "($\omega=0°$" with --($\Psi=0°$--
line 4, replace "($\omega-120°$" with --($\Psi=120°$--;
line 6, replace "($\omega=180°$" with --($\Psi=180°$--;
line 65, replace "et" with --$\alpha$--.

Column 5, line 2, replace "et" with --$\alpha$--;
line 30, replace "$\alpha=90°$" with --$\Psi=90°$--.

Column 7, line 6, (claim 4), replace "and a and a" with --and a first and a--;
line 7, (claim 4), after "output" insert --port--.

Signed and Sealed this

Thirteenth Day of May, 1997

*Attest:*

BRUCE LEHMAN

*Attesting Officer*     *Commissioner of Patents and Trademarks*